UNITED STATES PATENT OFFICE.

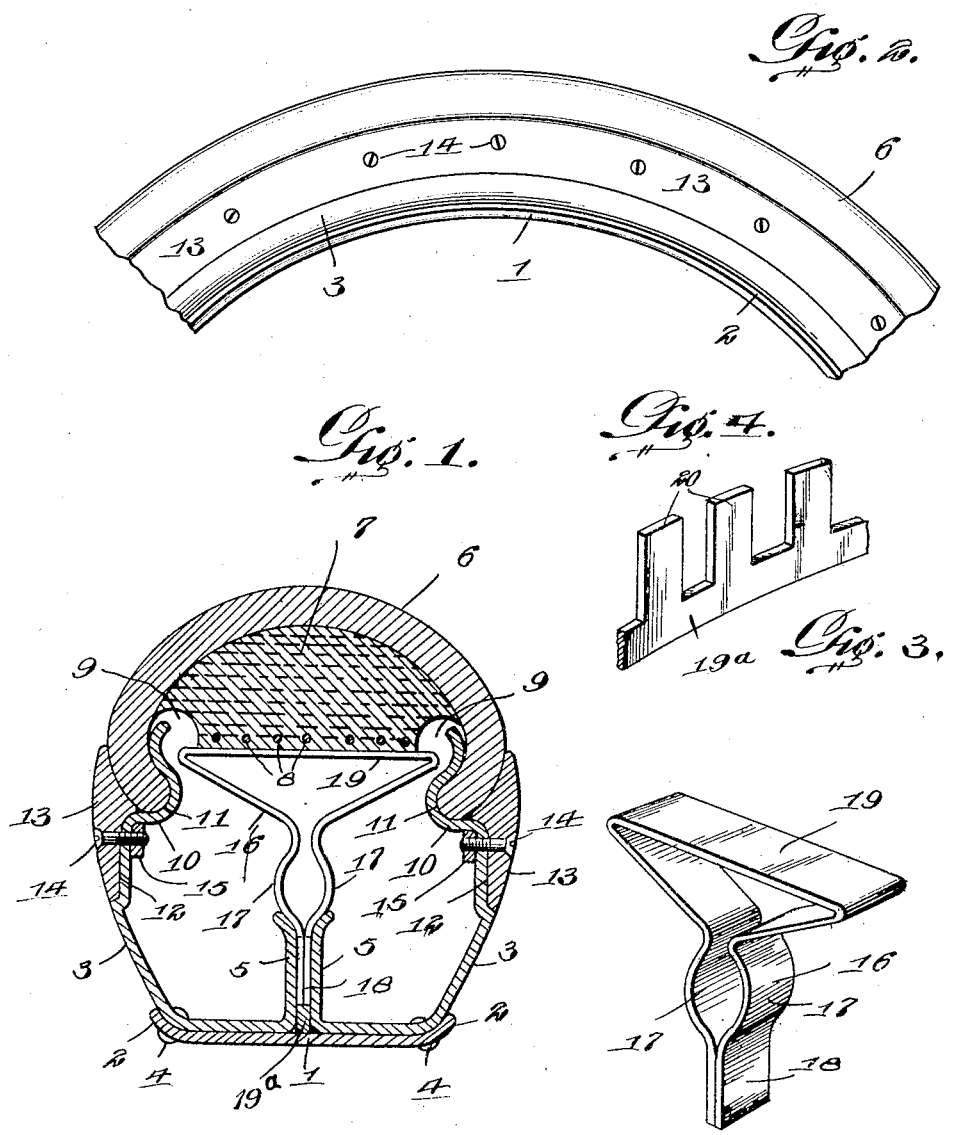

PETER J. WESTERGAARD, OF REINBECK, IOWA.

RESILIENT TIRE.

1,329,215.     Specification of Letters Patent.     Patented Jan. 27, 1920.

Application filed July 3, 1919. Serial No. 308,606.

*To all whom it may concern:*

Be it known that I, PETER J. WESTERGAARD, a citizen of the United States, residing at Reinbeck, in the county of Grundy and State of Iowa, have invented new and useful Improvements in Resilient Tires, of which the following is a specification.

This invention relates to resilient tires especially adapted for automobile motor trucks and other motor vehicles.

The object of the invention is to produce a highly resilient tire which does not require inflation and which is therefore not subject to deflation by puncture and is further not subject to blowouts due to excessive internal pressure when the wall of the tire becomes injured or weakened from any cause.

A further object of the invention is to produce a tire of the character above referred to in which the support is obtained by mechanical means including cushions in the form of springs of peculiar formation, combined with a resilient tread which is directly supported by the saddle portions of a circular series of springs, each of the springs being adapted to yieldably support the tread of the tire and to flex or yield without affecting the remaining springs or yieldable support for the tread.

Another object in view is to provide simple and efficient means for securing the springs to the base band or main body of the tire and also effecting means for securing or clamping in place the longitudinal edges or marginal portions of the tread.

With the above and other objects in view, the invention consists in the novel construction, combination and arrangement herein fully described, illustrated and claimed.

In the accompanying drawings:—

Figure 1 is transverse section through the improved tire.

Fig. 2 is a fragmentary side elevation of the same.

Fig. 3 is a detail perspective of one of the springs.

Fig. 4 is an enlarged perspective of a portion of the filler or spacing strip hereinafter referred to.

The tire contemplated in this invention, in the preferred embodiment thereof, comprises a suitably shaped base band 1 of metal, the same being of endless formation and shown as having the side edges thereof slightly turned upwardly or outwardly as shown at 2 to provide shoulders for retaining in place and properly positioning the side walls of the tire body. The band 1 may be shaped to suit any rim.

The side walls 3 are also formed of metal and the inner portions thereof are extended inwardly toward the center of the base band and in contact with said band to which they are riveted as shown at 4. Extending centrally outward from the inner portions of the side walls 3 are spring supports or spring holding and clamping members 5 between which the adjacent ends of each spring hereinafter described are clamped and held.

Connected with the outer portions of the side walls 3 of the tire is a tread 6 preferably of solid rubber, said tread having secured fixedly to the central portion of the inner wall thereof a reinforcing body 7 of any suitable fabric such as woven or textile fabric embedded in rubber and vulcanized. The reinforcing part 7 extends entirely around the inner side of the tire and embedded in the inner portion thereof are parallel endless wires 8 which serve to strengthen the tread and prevent undue expansion or enlargement thereof. The reinforcing part 7 is cut away at its opposite sides to form grooves or channels 9 which receive and provide clearance for the outer inturned edges of the side walls 3 of the tire as shown in Fig. 1 so as to prevent any danger of rim cutting.

In order to receive and hold the marginal or side edge portions of the tread 6, the outer portions of the side walls are inwardly offset as shown at 10 thereby forming channels 11 for the edges of the tread 6. The inwardly offset portions of the side walls of the tire also form rabbets or grooves 12 to receive tread clamping rings 13 of annular formation. Said rings being detachably secured in place by means of fasteners 14 shown in the form of headed screws which are inserted through the respective clamping rings 13 and through threaded openings in the adjacent side walls of the tire and in addition thereto reinforcing annular bands 15 may be united to the side walls 3 to receive the screws 14 as shown in Fig. 1.

In order to resiliently support the tread 6 at a large number of intervals throughout the length thereof, I employ a series of springs 16 arranged at suitable intervals apart so that each spring may act independently of all of the remaining springs. Each spring comprises a pair of inwardly extending arms or legs 17 which impart increased resiliency to the spring and the end portions of the arms or legs 17 are brought into parallel and contactural relation to each other as shown at 18 and are inserted between the spring holding members 5, to which they may be secured by any suitable fastening means if desired. Each spring 16 comprises in addition to the arms or legs 17, a transversely extending saddle portion 19 upon which the reinforcing parts 7 of the tread 6 is directly sustained. By making the joint between the side walls 3 and the baseband 1 airtight and by clamping the tread member 6 in place in the manner and by the means illustrated in the drawings, a body of air may also be confined within the tire as a whole to act as an additional supporting means for the tread 6. By arranging the springs at intervals, each spring is enabled to act independently and absorb a shock due to passing over a stone or other obstacle without affecting the remaining springs and the remainder of the tread of the tire. Broken springs may be renewed or replaced by removing the detachable clamping band 13. The tread may then be lifted from the remainder of the tire making it an easy matter to insert one or more new springs 16.

A circular filler or spacing strip 19$^a$ is interposed between the parts 5 (see Fig. 1) and has spacers or tongues 20 fitting between the portions 18 of the springs holding the latter at the proper distances apart and maintaining them there at all times.

What I claim is:—

1. A resilient tire comprising a base band and side walls of stiff material, a resilient tread secured along its side edges thereto and springs supporting the central portion of said tread at intervals, each of said springs being of hollow T-shaped formation and embodying transversely opposite legs the end portions of which are brought into parallel relation to each other, a reinforcing body interposed between the resilient tread and said springs, and spring holding members projecting outwardly from the base band and engaging the said parallel end portions of the springs.

2. A resilient tire comprising a base band and side walls of stiff material, a resilient tread secured along its side edges thereto and springs supporting the central portion of said tread at intervals, each of said springs being of hollow T-shaped formation and embodying transversely opposite legs, the end portions of which are brought into parallel relation to each other, a reinforcing body interposed between the resilient tread and said springs, and spring holding members projecting outwardly from the base band and engaging the said parallel end portions of the springs, the said parallel end portions of the springs being clamped together and the springs being maintained in spaced relation between said spring holding members.

In testimony whereof I affix my signature.

PETER J. WESTERGAARD.